US012623403B2

(12) United States Patent
Libinson

(10) Patent No.: US 12,623,403 B2
(45) Date of Patent: May 12, 2026

(54) METHOD AND SYSTEM FOR MANIPULATING CURING RADIATION IN THREE-DIMENSIONAL PRINTING

(71) Applicant: Stratasys Ltd., Rehovot (IL)

(72) Inventor: Alexander Libinson, Holon (IL)

(73) Assignee: Stratasys Ltd., Rehovot (IL)

( * ) Notice: Subject to any disclaimer, the term of this patent is extended or adjusted under 35 U.S.C. 154(b) by 0 days.

(21) Appl. No.: 19/133,716

(22) PCT Filed: Nov. 28, 2023

(86) PCT No.: PCT/IL2023/051220
§ 371 (c)(1),
(2) Date: May 29, 2025

(87) PCT Pub. No.: WO2024/116177
PCT Pub. Date: Jun. 6, 2024

(65) Prior Publication Data
US 2026/0008234 A1 Jan. 8, 2026

Related U.S. Application Data

(60) Provisional application No. 63/428,430, filed on Nov. 29, 2022.

(51) Int. Cl.
B29C 64/268 (2017.01)
B29C 64/112 (2017.01)
(Continued)

(52) U.S. Cl.
CPC .......... B29C 64/268 (2017.08); B29C 64/112 (2017.08); B29C 64/209 (2017.08);
(Continued)

(58) Field of Classification Search
CPC ... B29C 64/112; B29C 64/268; B29C 64/209; B29C 64/264; B29C 64/277; B33Y 10/00; B33Y 30/00
See application file for complete search history.

(56) References Cited

U.S. PATENT DOCUMENTS

| | | |
|---|---|---|
| 6,259,979 B1 | 7/2001 | I Iolmquist |
| 6,569,373 B2 | 5/2003 | Napadensky |

(Continued)

FOREIGN PATENT DOCUMENTS

| | | |
|---|---|---|
| JP | 2014-221538 | 11/2014 |
| WO | WO 2016/009426 | 1/2016 |
| WO | WO 2024/116177 | 6/2024 |

OTHER PUBLICATIONS

Office Action Dated Nov. 3, 2025 From the Israel Patent Office Re. Application No. 321186. (3 Pages).
(Continued)

*Primary Examiner* — Monica A Huson

(57) ABSTRACT

A system for additive manufacturing comprises an array of nozzles for dispensing a building material on a receiving surface; a curing system having an irradiation source emitting a beam of curing radiation, and a beam manipulator for manipulating an angular width of the beam on the building material. A computerized controller controls the array of nozzles to dispense the building material formulation to form a layer in a configured pattern corresponding to a slice of a three-dimensional object, and to control the beam manipulator to select an angular width of the beam based on a three-dimensional shape of a stack of previously formed layers.

20 Claims, 10 Drawing Sheets

(51) Int. Cl.
　　*B29C 64/209* 　　(2017.01)
　　*B29C 64/277* 　　(2017.01)
　　*B33Y 10/00* 　　(2015.01)
　　*B33Y 30/00* 　　(2015.01)

(52) U.S. Cl.
　　CPC ............. *B29C 64/277* (2017.08); *B33Y 10/00*
　　　　　　　　(2014.12); *B33Y 30/00* (2014.12)

(56) References Cited

U.S. PATENT DOCUMENTS

| | | |
|---|---|---|
| 6,658,314 B1 | 12/2003 | Gothait |
| 6,850,334 B1 | 2/2005 | Gothait |
| 6,863,859 B2 | 3/2005 | Levy |
| 7,183,335 B2 | 2/2007 | Napadensky |
| 7,209,797 B2 | 4/2007 | Kritchman et al. |
| 7,225,045 B2 | 5/2007 | Gothait et al. |
| 7,300,619 B2 | 11/2007 | Napadensky et al. |
| 7,500,846 B2 | 3/2009 | Eshed et al. |
| 9,031,680 B2 | 5/2015 | Napadensky |
| 9,227,365 B2 | 1/2016 | Dikovsky et al. |
| 2006/0054039 A1 | 3/2006 | Kritchman et al. |
| 2009/0210084 A1 | 8/2009 | Eshed et al. |
| 2016/0368217 A1 | 12/2016 | Kanda |

OTHER PUBLICATIONS

International Search Report and the Written Opinion Dated Feb. 9, 2024 From the International Searching Authority Re. Application No. PCT/IL2023/051220 (12 Pages).
International Preliminary Report on Patentability Dated Jun. 12, 2025 From the International Bureau of WIPO Re. Application No. PCT/IL2023/051220 (7 Pages).

METHOD AND SYSTEM FOR MANIPULATING CURING RADIATION IN THREE-DIMENSIONAL PRINTING

RELATED APPLICATIONS

This application is a National Phase of PCT Patent Application No. PCT/IL2023/051220 having International filing date of Nov. 28, 2023, which claims the benefit of priority under 35 USC § 119 (e) of U.S. Provisional Patent Application No. 63/428,430 filed on Nov. 29, 2022. The contents of the above applications are all incorporated by reference as if fully set forth herein in their entirety.

FIELD AND BACKGROUND OF THE INVENTION

The present invention, in some embodiments thereof, relates to three-dimensional printing and, more particularly, but not exclusively, to the manipulation of curing radiation in three-dimensional printing, e.g., three-dimensional inkjet printing.

Additive manufacturing (AM) is a technology enabling fabrication of shaped structures directly from computer data via additive formation steps. The basic operation of any AM system consists of slicing a three-dimensional computer model into thin cross sections, translating the result into two-dimensional position data and feeding the data to control equipment which fabricates a three-dimensional structure in a layerwise manner.

Additive manufacturing entails many different approaches to the method of fabrication, including three-dimensional (3D) printing such as 3D inkjet printing, electron beam melting, stereolithography, selective laser sintering, laminated object manufacturing, fused deposition modeling and others.

Some 3D printing processes, for example, 3D inkjet printing, are being performed by a layer by layer inkjet deposition of building materials. Thus, an uncured building material is dispensed from a dispensing head having a set of nozzles to deposit layers on a supporting structure. The layers are then cured by curing radiation emitted by a radiation.

Various three-dimensional printing techniques exist and are disclosed in, e.g., U.S. Pat. Nos. 6,259,979, 6,569,373, 6,658,314, 6,850,334, 6,863,859, 7,183,335, 7,209,797, 7,225,045, 7,300,619, 7,500,846, 9,031,680 and 9,227,365, U.S. Published application No. 20060054039, and International publication No. WO2016/009426, all by the same Assignee, and being hereby incorporated by reference in their entirety.

SUMMARY OF THE INVENTION

According to some embodiments of the invention the present invention there is provided a system for additive manufacturing of a three-dimensional object. The system comprises: an array of nozzles for dispensing a building material on a receiving surface; a curing system having an irradiation source emitting a beam of curing radiation, and a beam manipulator for manipulating an angular width of the beam on the building material; and a computerized controller configured to control the array of nozzles to dispense the building material formulation to form a layer in a configured pattern corresponding to a slice of the object, and to control the beam manipulator to select an angular width of the beam based on a three-dimensional shape of a stack of previously formed layers.

According to some embodiments of the invention for at least one layer, the controller is configured to select different angular widths of the beam at different regions of the layer.

According to some embodiments of the invention for at least two layers, the controller is configured to select different angular widths of the beam for different layers, but to maintain constant angular width for at least one of the at least two layers.

According to some embodiments of the invention the system comprises a user interface having a beam manipulation mode selector, wherein the controller is configured to receive from the beam manipulation mode selector input pertaining to a selection of a beam manipulation mode and to control the beam manipulator based on the input.

According to some embodiments of the invention the beam manipulation mode selector allows selecting between at least a first beam manipulation mode in which all layers of the object are formed while the angular width remains constant, and a second beam manipulation mode in which the angular width is varied at least once during or before formation of at least one of the layers.

According to some embodiments of the invention the controller is configured to increase the angular width when the curing system is above a vertical wall of the stack.

According to some embodiments of the invention the controller is configured to select the angular width based on a type of the building material forming the stack.

According to some embodiments of the invention there is a plurality of arrays of nozzles, each configured to dispense a different building material, and wherein the controller is configured to select the angular width based on a combination of building materials forming the stack.

According to some embodiments of the invention there are two curing systems, mounted at opposite sides of the array of nozzles, wherein an orientation of a beam manipulator of one of the curing systems is a reflection of an orientation of another one of the curing systems.

According to an aspect of some embodiments of the present invention there is provided a method of additive manufacturing of a three-dimensional object, the method comprising: dispensing a building material on a receiving surface to form a layer in a configured pattern corresponding to a slice of the object; emitting a beam of curing radiation onto on the layer; and manipulating an angular width of the beam on the building material based on a three-dimensional shape of a stack of previously formed layers.

According to some embodiments of the invention the manipulation of the angular width, for at least one layer, selecting different angular widths of the beam at different regions of the layer.

According to some embodiments of the invention the manipulation of the angular width comprises, for at least two layers, selecting different angular widths of the beam for different layers, but maintaining a constant angular width for at least one of the at least two layers.

According to some embodiments of the invention the method comprises selecting between a first beam manipulation mode in which all layers of the object are formed while the angular width remains constant, and a second beam manipulation mode in which the angular width is varied at least once during or before formation of at least one of the layers.

According to some embodiments of the invention the manipulation of the angular width comprises increasing the angular width when a curing system emitting the radiation is above a vertical wall of the stack.

According to some embodiments of the invention the manipulation of the angular width comprises selecting the angular width based on a type of the building material forming the stack.

According to some embodiments of the invention the method comprises dispensing a plurality of different building materials, wherein the manipulating comprises selecting the angular width based on a combination of building materials forming the stack.

According to some embodiments of the invention the manipulation of the angular width is by a beam manipulator comprising at least one reflective wall rotatable about an axis parallel to the receiving surface.

According to some embodiments of the invention the beam manipulator comprises at least two reflective walls, independently rotatable about the axis.

According to some embodiments of the invention the beam manipulator comprises at least two reflective walls, independently rotatable about different axes.

According to some embodiments of the invention the manipulation of the angular width is by a beam manipulator comprising at least one reflective wall rotatable about an axis parallel to the receiving surface, and a static reflective wall generally perpendicular to the receiving surface, and wherein the irradiation source is between the walls.

According to some embodiments of the invention the beam manipulator comprises a linear actuator configured to rotate the at least one rotatable reflective wall.

According to some embodiments of the invention the beam manipulator comprises a rotating actuator configured to rotate the at least one rotatable reflective wall.

According to some embodiments of the invention the dispensing is by an array of nozzles and the emitting is by two curing systems mounted at opposite sides of the array of nozzles.

According to some embodiments of the invention each curing system comprises a beam manipulator and wherein an orientation of a beam manipulator of one of the curing systems is a reflection of an orientation of another one of the curing systems.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced. In the Drawings.

DESCRIPTION OF SPECIFIC EMBODIMENTS OF THE INVENTION

Figure 1A:
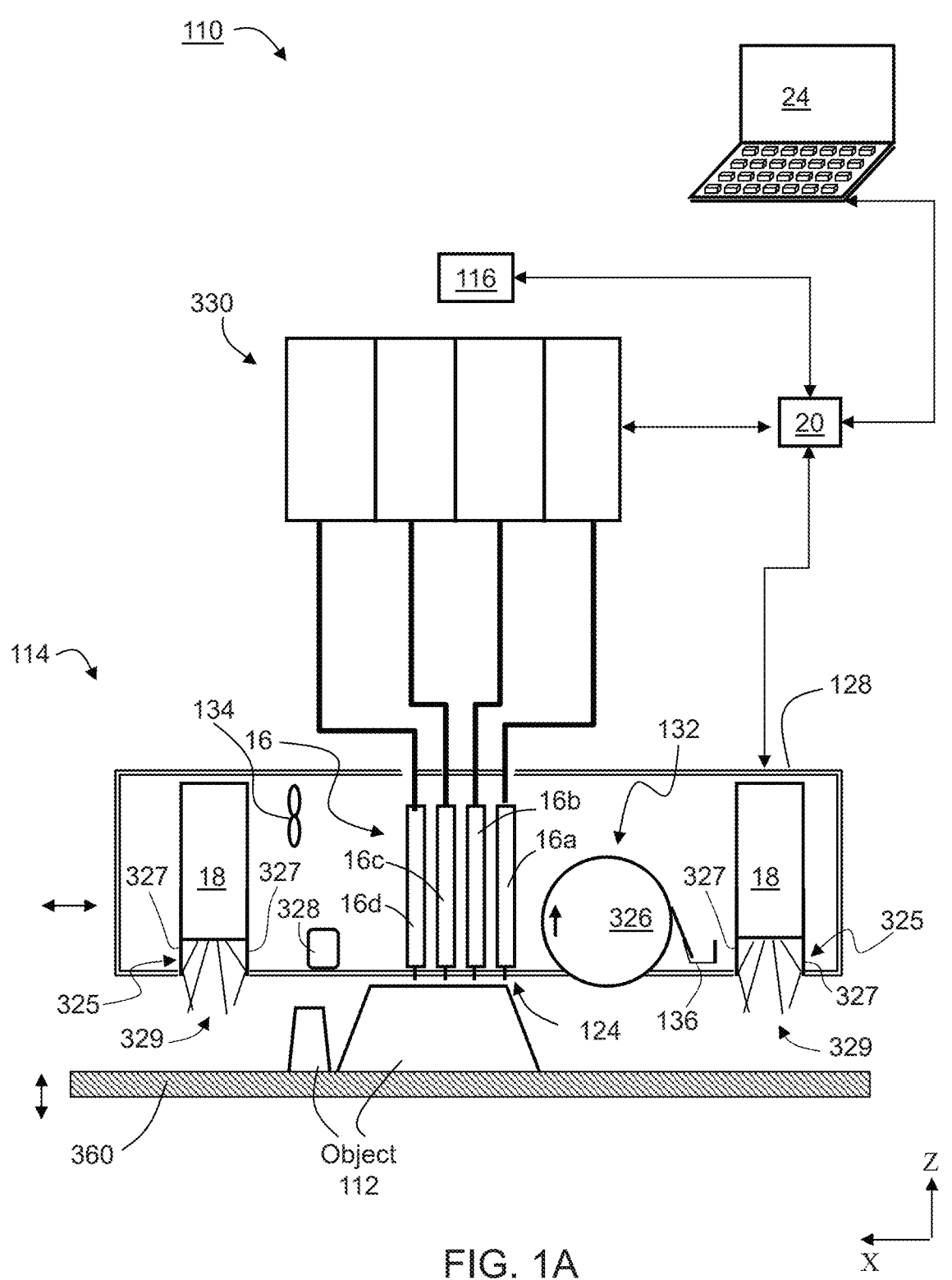
FIGS. 1A-D are schematic illustrations of an additive manufacturing system according to some embodiments of the invention.

The present invention, in some embodiments thereof, relates to three-dimensional printing and, more particularly, but not exclusively, to the manipulation of curing radiation in three-dimensional printing, e.g., three-dimensional inkjet printing.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The method and system of the present embodiments manufacture three-dimensional objects based on computer object data in a layerwise manner by forming a plurality of layers in a configured pattern corresponding to the shape of the objects. The computer object data can be in any known format, including, without limitation, a Standard Tessellation Language (STL) or a StereoLithography Contour (SLC) format, an OBJ File format (OBJ), a 3D Manufacturing Format (3MF), Virtual Reality Modeling Language (VRML), Additive Manufacturing File (AMF) format, Drawing Exchange Format (DXF), Polygon File Format (PLY), 3D Manufacturing Format (3MF), Object file format (OBJ), or any other format suitable for Computer-Aided Design (CAD).

The term "object" as used herein refers to a whole object or a part thereof.

Each layer is formed by an additive manufacturing apparatus which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material formulation, and which type of building material formulation is to be delivered thereto. The decision is made according to a computer image of the surface.

In preferred embodiments of the present invention the AM comprises three-dimensional printing, more preferably three-dimensional inkjet printing. In these embodiments a building material is dispensed from a printing head having one or more arrays of nozzles to deposit building material in layers on a supporting structure. The AM apparatus thus dispenses building material in target locations which are to be occupied and leaves other target locations void. The apparatus typically includes a plurality of arrays of nozzles, each of which can be configured to dispense a different building material. This is typically achieved by providing the printing head with a plurality of fluid channels are separated from each other such that there is no fluid communication therebetween, wherein each channel receives a different building material through a separate inlet and conveys it to a different array of nozzles.

Thus, different target locations can be occupied by different building material formulations. The types of building material formulations can be categorized into two major categories: modeling material formulation and support material formulation. The support material formulation serves as a supporting matrix or construction for supporting the object or object parts during the fabrication process and/or other purposes, e.g., providing hollow or porous objects. Support constructions may additionally include modeling material formulation elements, e.g. for further support strength.

The modeling material formulation is generally a composition which is formulated for use in additive manufacturing and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of solid freeform fabrication.

In some exemplary embodiments of the invention an object is manufactured by dispensing two or more different modeling material formulations, each material formulation from a different array of nozzles (belonging to the same or different printing heads) of the AM apparatus. In some embodiments, two or more such arrays of nozzles that dispense different modeling material formulations are both located in the same printing head of the AM apparatus. In some embodiments, arrays of nozzles that dispense different modeling material formulations are located in separate printing heads, for example, a first array of nozzles dispensing a first modeling material formulation is located in a first printing head, and a second array of nozzles dispensing a second modeling material formulation is located in a second printing head.

In some embodiments, an array of nozzles that dispense a modeling material formulation and an array of nozzles that dispense a support material formulation are both located in the same printing head. In some embodiments, an array of nozzles that dispense a modeling material formulation and an array of nozzles that dispense a support material formulation are located in separate printing heads.

Figure 2A:
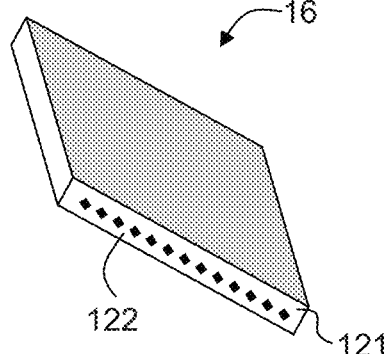
FIGS. 2A-2C are schematic illustrations of printing heads according to some embodiments of the present invention.
Figure 2B:
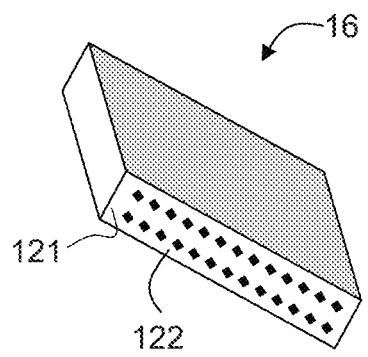
Figure 2C:
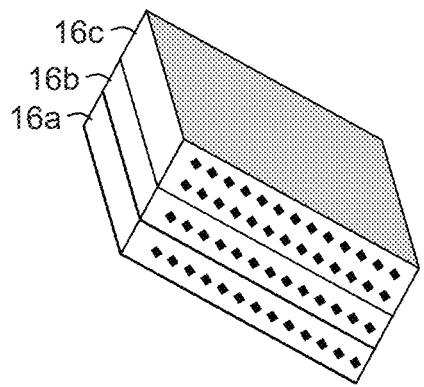

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of printing heads. Each head preferably comprises one or more arrays of nozzles 122, typically mounted on an orifice plate 121, as illustrated in FIGS. 2A-C described below, through which a liquid building material formulation 124 is dispensed.

Preferably, but not obligatorily, apparatus 114 is a three-dimensional printing apparatus, in which case the printing heads are printing heads, and the building material formulation is dispensed via inkjet technology. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material formulation deposition apparatus.

Each printing head is optionally and preferably fed via one or more building material formulation reservoirs which may optionally include a temperature control unit (e.g., a temperature sensor and/or a heating device), and a material formulation level sensor. To dispense the building material formulation, a voltage signal is applied to the printing heads to selectively deposit droplets of material formulation via the printing head nozzles, for example, as in piezoelectric inkjet printing technology. Another example includes thermal inkjet printing heads. In these types of heads, there are heater elements in thermal contact with the building material formulation, for heating the building material formulation to form gas bubbles therein, upon activation of the heater elements by a voltage signal. The gas bubbles generate pressures in the building material formulation, causing droplets of building material formulation to be ejected through the nozzles. Piezoelectric and thermal printing heads are known to those skilled in the art of solid freeform fabrication. For any types of inkjet printing heads, the dispensing rate of the head depends on the number of nozzles, the type of nozzles and the applied voltage signal rate (frequency).

In an embodiment of the invention, the overall number of dispensing nozzles or nozzle arrays is selected such that half of the dispensing nozzles are designated to dispense support material formulation and half of the dispensing nozzles are designated to dispense modeling material formulation, i.e. the number of nozzles jetting modeling material formulations is the same as the number of nozzles jetting support material formulation. The ratio of modeling material dispensing arrays to support material dispensing arrays may vary. In the representative example of FIG. 1A, four printing heads 16a, 16b, 16c and 16d are illustrated. Each of heads 16a, 16b, 16c and 16d has a nozzle array. In this Example, heads 16a and 16b can be designated for modeling material formulation/s and heads 16c and 16d can be designated for support material formulation. Thus, head 16a can dispense one modeling material formulation, head 16b can dispense another modeling material formulation and heads 16c and 16d can both dispense support material formulation. In an alternative embodiment, heads 16c and 16d, for example, may be combined in a single head having two nozzle arrays for depositing support material formulation. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material formulation printing heads (modeling heads) and the number of support material formulation printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material formulation equals the height of support material formulation. Typical values for $\alpha$ are from about 0.6 to about 1.5.

As used herein throughout the term "about" refers to +10%.

For example, for $\alpha=1$, the overall dispensing rate of support material formulation is generally the same as the overall dispensing rate of the modeling material formulation when all the arrays of nozzles operate.

Apparatus 114 can comprise, for example, M modeling heads each having m arrays of p nozzles, and S support heads each having s arrays of q nozzles such that M×m× p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

Apparatus 114 can further comprise one or more solidifying devices 18 each can include any device configured to emit light, heat or the like that may cause the deposited material formulation to harden. For example, solidifying device 18 can comprise one or more radiation sources, which can be, for example, an ultraviolet or visible or infrared lamp, or other sources of electromagnetic radiation, or electron beam source, depending on the modeling material formulation being used. The radiation source can in some embodiments of the present invention be selected from the group consisting of a light emitting diode (LED), a digital light processing (DLP) system, a resistive lamp and the like. In some embodiments of the present invention, solidifying device 18 serves for curing or solidifying the modeling material formulation.

Solidifying device 18 can also comprise a radiation shield 325 having reflecting walls 327 for narrowing the angular width of the radiation beam 329 (shown as a bundle of thin lines) emitted by the source. The advantage of having radiation shield 325 is that it reduces the likelihood for radiation that is reflected off the surface of object 112 to arrive at the nozzle arrays of heads 16 and creates occlusions by solidifying the building material on nozzles.

In addition to solidifying device 18, apparatus 114 optionally and preferably comprises an additional radiation source 328, for solvent evaporation. Radiation source 328 optionally and preferably generates infrared radiation. In various exemplary embodiments of the invention solidifying device 18 comprises a radiation source generating ultraviolet radiation, and radiation source 328 generates infrared radiation.

In some embodiments of the present invention apparatus 114 comprises cooling system 134 such as one or more fans or the like.

The printing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the printing heads to at least partially cure or solidify the material formulations just dispensed by the printing heads. Tray 360 is positioned horizontally. According to the common conventions an X-Y-Z Cartesian coordinate system is selected such that the X-Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material formulation generated during leveling. Waste collection device 136 may comprise any mechanism that delivers the material formulation to a waste tank or waste cartridge.

In use, the printing heads of unit 16 move in a scanning direction, which is referred to herein as the X direction, and selectively dispense building material formulation in a predetermined configuration in the course of their passage over tray 360. The building material formulation typically comprises one or more types of support material formulation and one or more types of modeling material formulation. The passage of the printing heads of unit 16 is followed by the curing of the modeling material formulation(s) by radiation source 126. In the reverse passage of the heads, back to their starting point for the layer just deposited, an additional dispensing of building material formulation may be carried out, according to predetermined configuration. In the forward and/or reverse passages of the printing heads, the layer thus formed may be straightened by leveling device 326, which preferably follows the path of the printing heads in their forward and/or reverse movement. Once the printing heads return to their starting point along the X direction, they may move to another position along an indexing direction, referred to herein as the Y direction, and continue to build the same layer by reciprocal movement along the X direction. Alternately, the printing heads may move in the Y direction between forward and reverse movements or after more than one forward-reverse movement. The series of scans performed by the printing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the printing head of unit 16, within the layer. Such Z displacement is carried out in order to cause contact of the leveling device with the surface in one direction and prevent contact in the other direction.

System 110 optionally and preferably comprises a building material formulation supply system 330 which comprises the building material formulation containers or cartridges and supplies a plurality of building material formulations to fabrication apparatus 114.

A controller 20 controls fabrication apparatus 114 and optionally and preferably also supply system 330. Controller 20 typically includes an electronic circuit configured to perform the controlling operations. Controller 20 preferably communicates with a data processor 24 which transmits digital data pertaining to fabrication instructions based on computer object data, e.g., a CAD configuration represented on a computer readable medium in a form of a Standard Tessellation Language (STL) format or the like. Typically, controller 20 controls the voltage applied to each printing head or each nozzle array and the temperature of the building material formulation in the respective printing head or respective nozzle array.

Once the manufacturing data is loaded to controller 20 it can operate without user intervention. In some embodiments, controller 20 receives additional input from the operator, e.g., using data processor 24 or using a user interface 116 communicating with controller 20. User interface 116 can be of any type known in the art, such as, but not limited to, a keyboard, a touch screen and the like. For example, controller 20 can receive, as additional input, one or more building material formulation types and/or attributes, such as, but not limited to, color, characteristic distortion and/or transition temperature, viscosity, electrical property, magnetic property. Other attributes and groups of attributes are also contemplated.

Figures 1B, 1C:
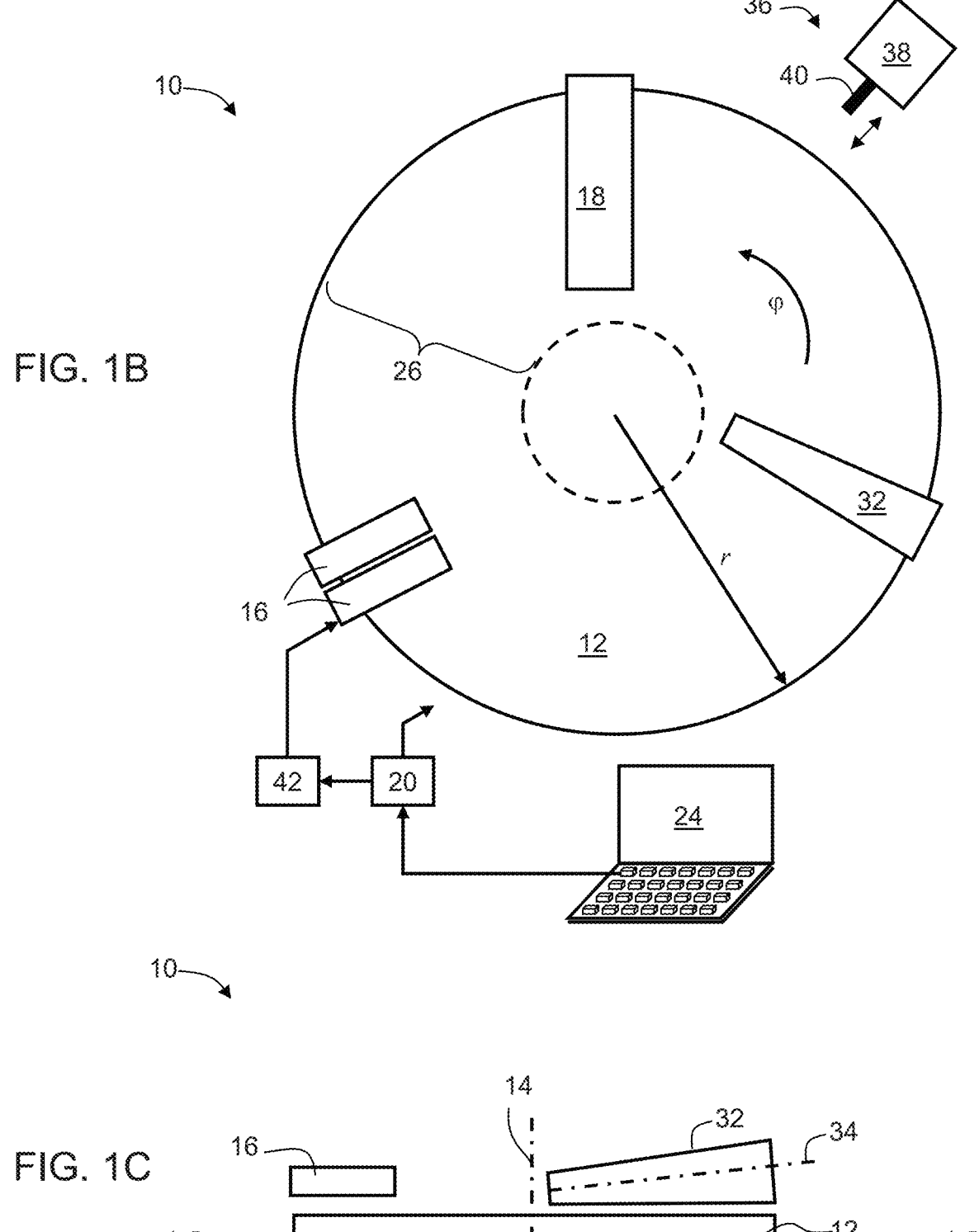
Figure 1D:
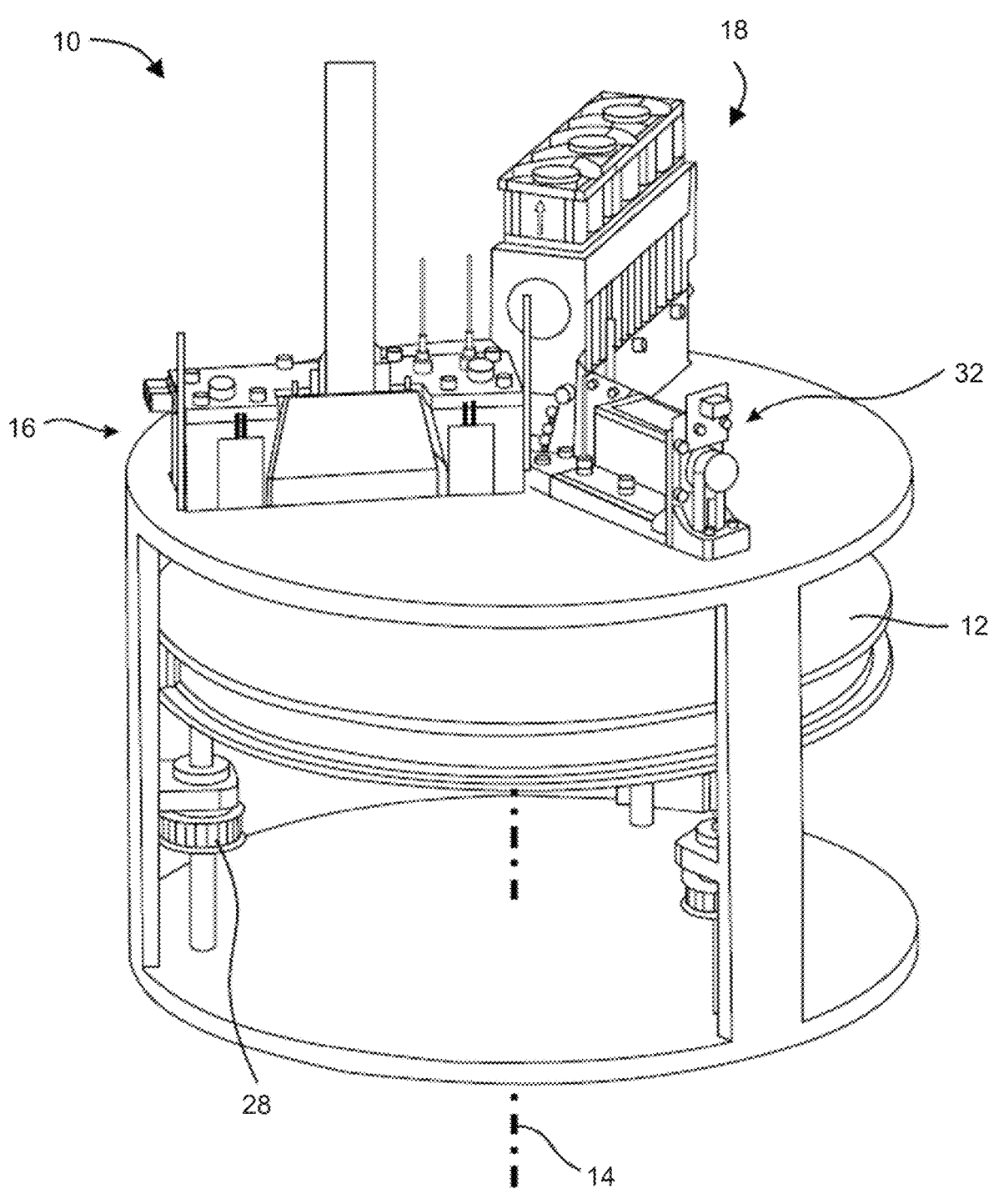

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having one or more arrays of nozzles with respective one or more pluralities of separated nozzles. The material used for the three-dimensional printing is supplied to heads 16 by a building material supply system 42. Tray 12 can have a shape of a disk or it can be annular. Non-round shapes are also contemplated, provided they can be rotated about a vertical axis.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While some embodiments of system 10 are described below with a particular emphasis to configuration (i) wherein the tray is a rotary tray that is configured to rotate about vertical axis 14 relative to heads 16, it is to be understood that the present application contemplates also configurations (ii) and (iii) for system 10. Any one of the embodiments of system 10 described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction φ, and a direction perpendicular to tray 12 is referred to herein is the vertical direction z.

The radial direction r in system 10 enacts the indexing direction y in system 110, and the azimuthal direction φ enacts the scanning direction x in system 110. Therefore, the radial direction is interchangeably referred to herein as the indexing direction, and the azimuthal direction is interchangeably referred to herein as the scanning direction.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a building platform for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-2C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a stabilizing structure 30 positioned below heads 16 such that tray 12 is between stabilizing structure 30 and heads 16. Stabilizing structure 30 may serve for preventing or reducing vibrations of tray 12 that may occur while inkjet printing heads 16 operate. In configurations in which printing heads 16 rotate about axis 14, stabilizing structure 30 preferably also rotates such that stabilizing structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, stabilizing structure 30 preferably also moves vertically together with tray 12. In configurations in which the vertical distance is varied by heads 16 along the vertical direction, while maintaining the vertical position of tray 12 fixed, stabilizing structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
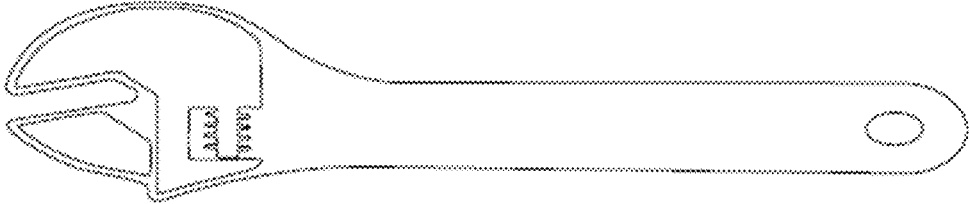
FIGS. 3A and 3B are schematic illustrations demonstrating coordinate transformations according to some embodiments of the present invention.
Figure 3B:

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material formulation at different radial positions. Representative examples of coordinate transformations according to some embodiments of the present invention are provided in FIGS. 3A-B, showing a slice of an object (corresponding to fabrication instructions of one layer of the object), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material formulation in layers, such as to print a three-dimensional object on tray 12.

System 10 optionally and preferably comprises one or more solidifying devices 18, each can be, the same or similar to the solidifying device described above with respect to system 110, and may also include a radiation shield 325 (not shown, see FIG. 1A), as further detailed hereinabove.

In various exemplary embodiments of the invention the operation of solidifying device 18 is controlled by controller 20 which may activate and deactivate the radiation source of solidifying device 18 and may optionally also control the amount of radiation generated by solidifying device 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 1C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different material formulations from different arrays of nozzles (belonging to the same or different printing head). These embodiments provide, inter alia, the ability to select material formulations from a given number of material formulations and define desired combinations of the selected material formulations and their properties. According to the present embodiments, the spatial locations of the deposition of each material formulation with the layer is defined, either to effect occupation of different three-dimensional spatial locations by different material formulations, or to effect occupation of substantially the same three-dimensional location or adjacent three-dimensional locations by two or more different material formulations so as to allow post deposition spatial combination of the material formulations within the layer, thereby to form a composite material formulation at the respective location or locations.

Any post deposition combination or mix of modeling material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations may be formed.

In some embodiments of the present invention the system dispenses digital material formulation for at least one of the layers.

The phrase "digital material formulations", as used herein and in the art, describes a combination of two or more material formulations on a pixel level or voxel level such that pixels or voxels of different material formulations are interlaced with one another over a region. Such digital material formulations may exhibit new properties that are affected by the selection of types of material formulations and/or the ratio and relative spatial distribution of two or more material formulations.

As used herein, a "voxel" of a layer refers to a physical three-dimensional elementary volume within the layer that corresponds to a single pixel of a bitmap describing the layer. The size of a voxel is approximately the size of a region that is formed by a building material, once the building material is dispensed at a location corresponding to the respective pixel, leveled, and solidified.

The present embodiments thus enable the deposition of a broad range of material formulation combinations, and the fabrication of an object which may consist of multiple different combinations of material formulations, in different parts of the object, according to the properties desired to characterize each part of the object.

Further details on the principles and operations of an AM system suitable for the present embodiments are found in U.S. Pat. No. 9,031,680, the contents of which are hereby incorporated by reference.

While conceiving the present embodiments it has been hypothesized and while reducing the present embodiments to practice it has been realized that while the radiation shield 325 of solidifying device 18 (FIGS. 1A-D) solves the problem of nozzle occlusion due to reflected radiation impinging on the nozzle arrays 122 of heads 16, this solution may create operative problems that would best be avoided. Broadly speaking, the Inventor realized that fixed angular width provided by radiation shield 325 may be adequate for some objects but may be less adequate for other objects.

Figure 4A:
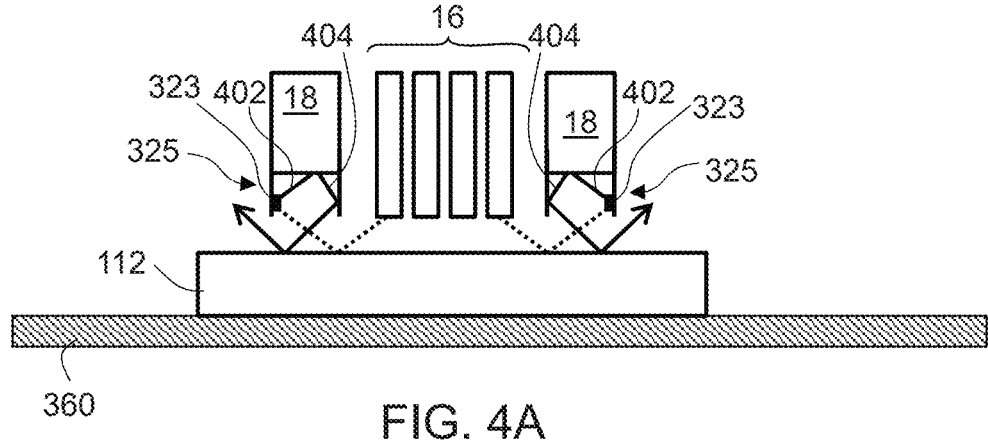
FIGS. 4A and 4B are schematic illustrations showing ray tracing of radiation emitted by a solidifying device having a radiation shield that includes radiation absorbers.
Figure 4B:
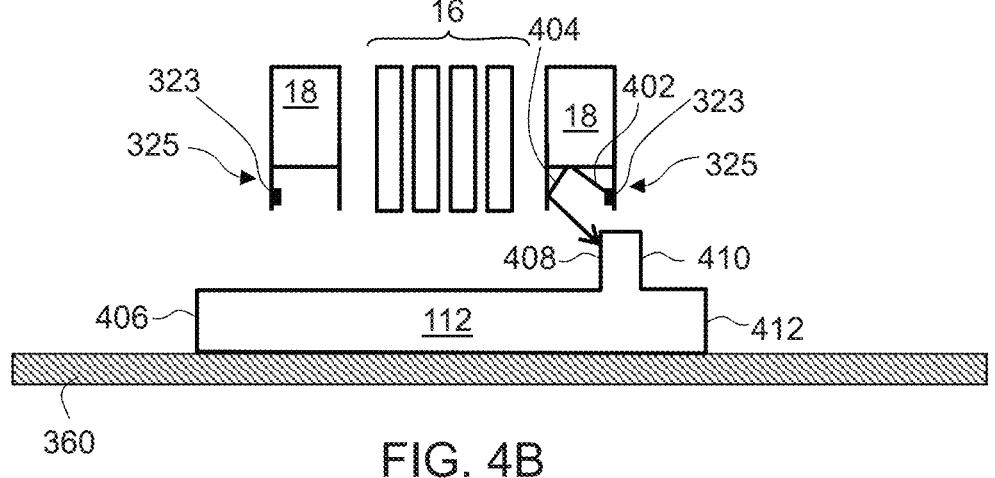

A representative example of an operative problem that may be caused by a fixed angular width is illustrated in FIGS. 4A and 4B, which is a partial view of system 110 showing heads 16, two solidifying devices 18 at opposite sides of heads 16, and tray 360. As it is generally desired to provide the radiation beam with a lateral span which is as wide as possible, but still reduce the likelihood for the reflected radiation to arrive at the nozzle arrays, radiation shield 325 is typically made in a manner that some of the radiation is absorbed by radiation shield 325. In the configuration shown in FIGS. 4A and 4B, each of the reflective radiation shields 325 has one or more radiation absorbers 323 on one or more of its walls so as to create an asymmetry in the angular span of the radiation beam. The asymmetry is created by placing the radiation absorbers 323 only at locations that intersect with rays of the radiation that may potentially imping on the nozzle arrays of heads 16. Thus, rays 402 are absorbed by absorbers 323, since their path (shown as dotted lines) may reach the nozzle arrays of heads 16, but rays 404 are not absorbed, since they propagate away from heads 16 and have no potential of impinging the nozzle arrays of heads 16.

As long as both solidifying devices 18 operate, and as long as the three-dimensional shape of the outer surface of object 112 is generally flat (FIG. 4A), the configuration provides an adequate solution whereby the relative motion between the tray 360 and the printing block including heads 16 and devices 18 ultimately ensures that all parts of the object's surface receive generally the same radiation dose. However, when only one of solidifying devices 18 operates, the distribution is no longer uniform due to the asymmetry of the shield. This problem is particularly aggravated at vertical walls of object 112 since the overall radiation dose that a vertical wall receives depends on the side of the radiation shield that faces the wall. FIG. 4B illustrates such a situation. In FIG. 4B, only one of the solidifying devices 18 is operative, and object 112 includes four vertical walls 406, 408, 410 and 412. Rays like ray 404 arrive at walls 408 and 406, but not to walls 410 and 412, resulting in a situation in which the radiation dose is higher at walls 406 and 408 than at walls 410 and 412.

The Inventor has therefore devised a curing system that comprises a controllable beam manipulator that can select different angular widths of the radiation beam at different circumstances. A schematic illustration of a curing system 500 suitable for the present embodiments is illustrated in FIGS. 5A-E. Curing system 500 comprises one or more irradiation sources 502 emitting a beam 504 of curing radiation, and a controllable beam manipulator 506 for manipulating an angular width of beam 504. Curing system 500 can be used as a solidifying device in any three-dimensional printing system which can establish a relative motion between curing system 500 and a working surface of the system. For example, curing system 500 can replace one or more of solidifying devices 18 of systems 10 or 110 described above.

The curing radiation emitted by source(s) 502 can be of any of the aforementioned types, such as, but not limited to, electromagnetic radiation (e.g., ultraviolet radiation, visible radiation, infrared radiation), and electronic radiation (also known as beta radiation), and source(s) 502 is selected based on the desired type of radiation. When there is a plurality of sources 502 (see, e.g., FIG. 5D), they are preferably arranged along the indexing direction y (in case of a system such as system 110) or r (in case of a system such as system 10).

As used herein "angular width" of a radiation beams refers to an angle that describes a span of the beam over a plane perpendicular to the propagation direction of the central ray of the radiation, where at each location within the span the power density of the radiation is at least 50% of the highest radiation power density over the span. As a representative example to the meaning of the term angular width, which is not to be considered as limiting, in spherically symmetric radiation, the angular width is the opening angle of a cone defined such that the radiation power density at each point over the base of the cone is at least 50% of the radiation power density at the center of the base.

Beam manipulator 506 can be embodied in more than one way. Representative examples of such embodiments are described hereinbelow.

In use, the computerized controller of the three-dimensional printing system (e.g., controller 20) controls beam manipulator 506 to select an angular width of beam 504 based on a three-dimensional shape of a stack of previously formed layers of the object. Since shape of the object is known from the computer object data, controller 20 can select the angular width based on the computer object data that describe the previously formed layers. Typically, but not necessarily, the controller increases the angular width when curing system 500 is above a vertical wall of the stack at different regions of layer. The advantage of this embodiment is that it allows a more uniform solidification of the vertical walls, as further detailed hereinbelow.

For a given layer, the controller can control the angular width dynamically during the formation of the layer, in which case it preferably selects different angular widths of beam 504 at different regions of the layer. The controller can alternatively maintain a constant angular width for a given layer, but select different angular widths of beam for two or more of the layers. In some embodiments of the present invention the operator can select a beam manipulation mode according to which the controller controls beam manipulator 506. For example, the user can select a first beam manipulation mode in which all layers of the object are formed while the angular width remains constant. Thus, in the first mode, the same angular width is used throughout the build of the object. The user can select a second beam manipulation mode in which the angular width is varied at least once before the formation of at least one of the layers but is maintained constant during the formation of the layer. Consider, for example, two layers A and B that are formed. When the user selects the second beam manipulation mode, layer A can receive a radiation beam having a first angular width $W_1$, and layer B can receive a radiation beam having a different angular width $W_2$, wherein $W_1$ is fixed during the build of layer A and $W_2$ is fixed during the build of layer B. The user can select a third beam manipulation mode in which the angular width is varied at least once during the formation of the layers. Referring to the above example of layers A and B, a part of a layer (e.g., layer A) can receive a radiation beam having an angular $W_1$ and another part of the same layer A can receive a radiation beam having an angular $W_2$. In any of the aforementioned second and third beam manipulation modes, the selection of the angular width is preferably automatic based on the three-dimensional shape of the stack of layer that are beneath the currently formed layer. In the first beam manipulation mode, the selection of the angular width can be manual by the operator, or automatic by the controller.

The selection between the beam manipulation modes can be by means of the user interface of the three-dimensional printing system (e.g., user interface 116) or by means of the data processor (e.g., data processor 24) which can present the operator with a beam manipulation mode selector that allows the operator to select the desired mode. The controller receives from beam manipulation mode selector input pertaining to the selection and controls beam manipulator 506 based on the input.

In some embodiments of the present invention the controller selects the angular width also based on the type of building material that forms the stack of layers, or, when the stack is formed of a plurality of building materials, based on the combination of building materials that forms the stack. Typically, the controller can select the angular width based on the reflectivity of the building material to the radiation. For example, for building materials with a reflectivity that is less than a predefined value, the angular width can be larger because there is a low likelihood the radiation to arrive at the nozzle array of the printing head.

As stated, there is more than one way to embody beam manipulator 506. In some embodiments of the present invention manipulator 506 comprises a controllable lens or lens array capable of redirecting the direction of rays of the radiation in a controllable way. For example, when the radiation is electromagnetic, the controllable lens or lens array can be made of a material that is transparent to the spectrum of the radiation. The control over the lens can include controlling the curvature of the lens, and the control over the lens array can include controlling the distance between the lenses of the array.

Other embodiments of manipulator 506 are illustrated in FIGS. 5B-5E. In these embodiments beam manipulator 506 comprises one or more reflective walls 510 rotatable about an axis 512, which is preferably parallel to the tray of the printing system, more preferably parallel to the indexing direction y or r. In the schematic illustration shown in FIG.

5B, beam manipulator 506 comprises rotatable reflective wall 510 and also a static reflective wall 514 generally perpendicular to the tray of the printing system. However, this need not necessarily be the case, since, for some applications, it may be desired to provide beam manipulator 506 with two rotatable reflective walls, like wall 510, each being independently rotatable about a different axis. For example, two rotatable reflective walls, can be at opposite sides of source(s) 502.

Figures 5A, 5B, 5C, 5D, 5E:
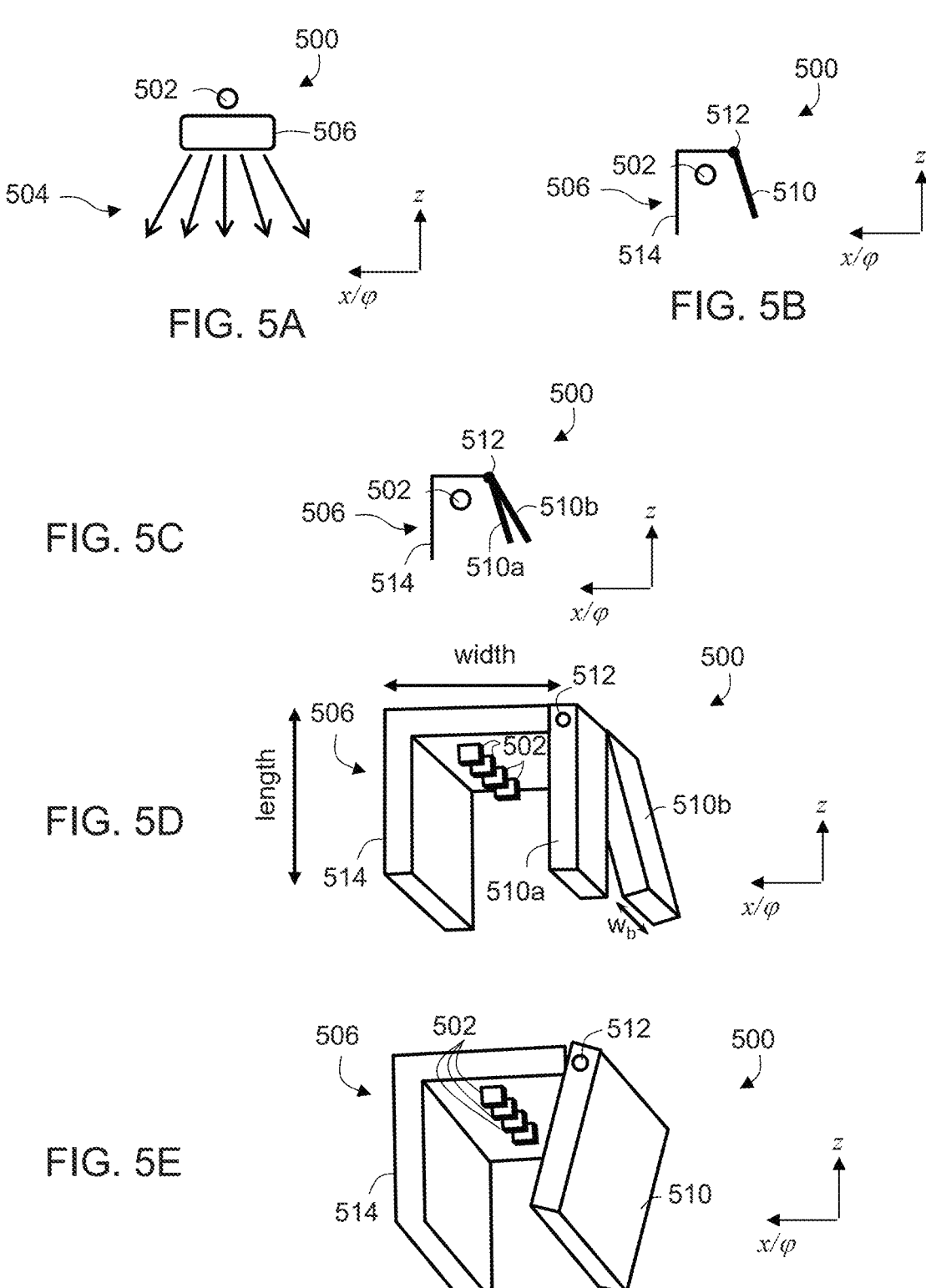
FIGS. 5A-E are schematic illustrations of a curing system in embodiments of the invention in which the curing system comprises an irradiation source and a controllable beam manipulator.

Also contemplated, are embodiments in which beam manipulator 506 comprises two or more reflective walls 510a, 510b that are independently rotatable about the same axis 512. These embodiments are illustrated in FIGS. 5C (cross-sectional view) and 5D (perspective view). The advantage of these embodiments is that it allows selecting different angular widths of the same radiation beam over different regions of the stack, in which case the controller can control walls 510a and 510b to assume different angles with respect to the vertical direction. This can be useful, for example, when the stack has a vertical wall that is narrow along the indexing direction y or r. As a representative example, consider a case in which there is a vertical wall whose width along the indexing direction is approximately equal to the width $w_b$ of reflective wall 510b (see FIG. 5D), and in which reflective wall 510b is aligned along the indexing direction with the wall of the stack (e.g., by establishing relative motion along the indexing direction between the tray and curing system 500). In this case, when curing system 500 approaches the wall of the stack, the controller causes reflective wall 510b to assume a wider angle than reflective wall 510a, so as to provide a beam having a wider angular width at the region of the stack below reflective wall 510b and a narrower angular width at the region of the stack below reflective wall 510b.

The rotatable wall(s) 510 beam manipulator 506 can also be oriented such that the radiation beam includes more rays that are oblique at wide angles than rays that are vertical or oblique at smaller angles. This configuration is illustrated in FIG. 5E.

The advantage of system 500 is therefore, that it redirects the rays of the radiation emitted by source(s) 502 in a controllable way.

The motion of beam manipulator 506 can be established by means of a linear actuator or a rotating actuator, as desired. Preferably, when a linear actuator is employed, its stroke length is of from about 2 mm to about 5 mm, with accuracy of from about 0.001 mm to about 0.01 mm. The stroke duration is preferably 0.1 seconds or less, which, for the aforementioned stroke length, can be achieved be operating the actuator at a speed of from about 20 mm/s to about 100 mm/s. Representative examples of linear actuators suitable for the present embodiments include without limitation RasuunDrive® HighAcc 10 mm-Type 1, commercially available from Micromotion GmbH, and NCC01-04-001-1X, commercially available from H2W Technologies, Inc, USA.

Preferably, when a rotating actuator is employed, the motion is achieved by means of an eccentric or elliptic element on an axis of a rotating motor. The rotation amplitude in this case is preferably from about 15 degrees to about 45 degrees, with accuracy of from about 0.1 degree to about 1 degree. The rotating period is preferably 0.1 seconds or less. Representative examples of rotating actuators suitable for the present embodiments include without limitation a stepper motor, such as, but not limited to, PH010 064 which is commercially available from Portescap, Switzerland.

Figure 6:
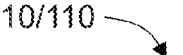
FIG. 6 is a schematic illustration of a three-dimensional printing system in embodiments of the invention in which the solidifying device employs the curing system shown in FIGS. 5A-E.
Figure 6:
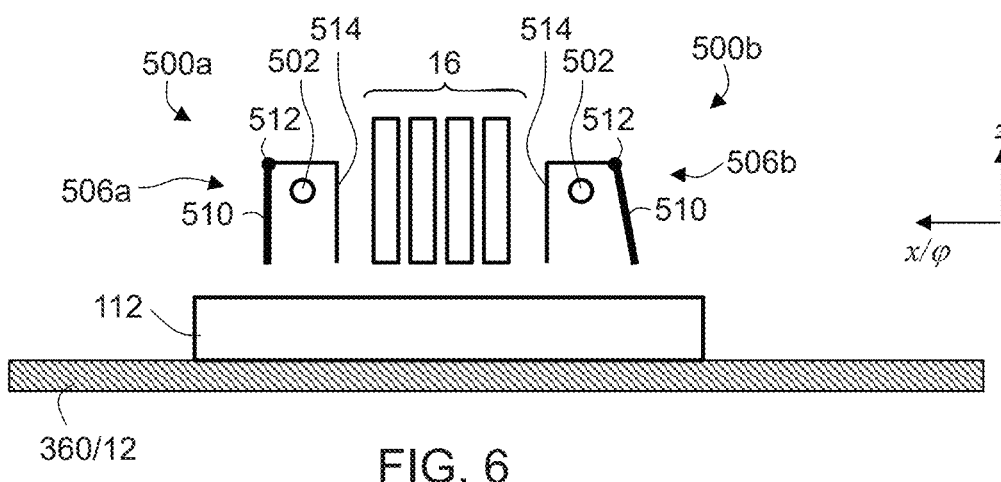

FIG. 6 is a schematic illustration of a three-dimensional printing system such as, but not limited to, system 10 or 110, in embodiments in which the printing system includes two curing systems 500a and 500b. FIG. 6 provides a partial view of system 10/110 showing heads 16, two curing systems 500a and 500b at opposite sides of heads 16, and tray 12/360. When system 10 or 110 includes two curing systems, they are preferably mounted at opposite sides of heads 16, wherein the orientation of one of the beam manipulator 506a, is a geometrical reflection with respect to the scanning direction x or φ, of the orientation of the other beam manipulator 506b. Specifically, when beam manipulator 506a is oriented such that its rotatable wall is away from head 16, beam manipulator 506b, which is at the opposite side of head 16, is also oriented such that its rotatable wall is away from head 16.

Figure 7A:
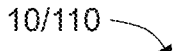
FIGS. 7A-C are schematic illustrations showing a preferred operational principle of the system shown in FIG. 6.
Figure 7A:
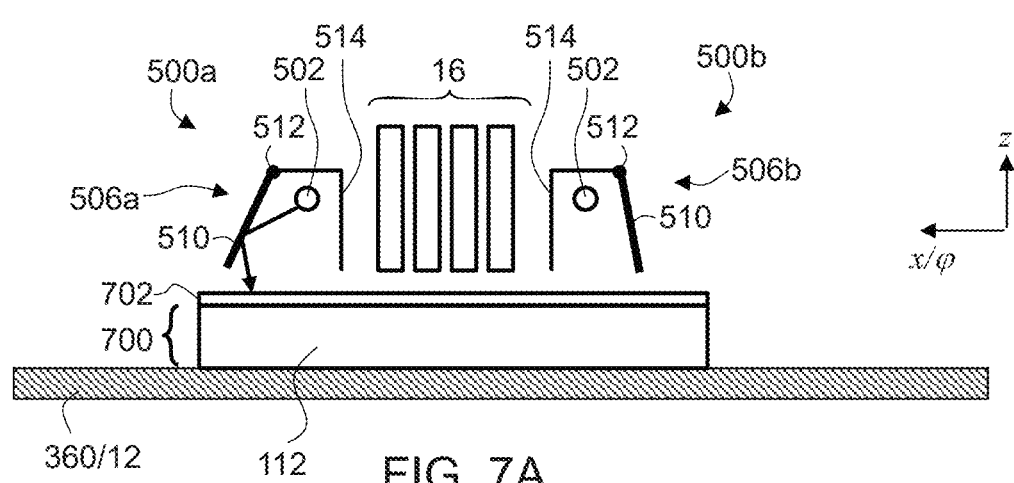
Figure 7B:
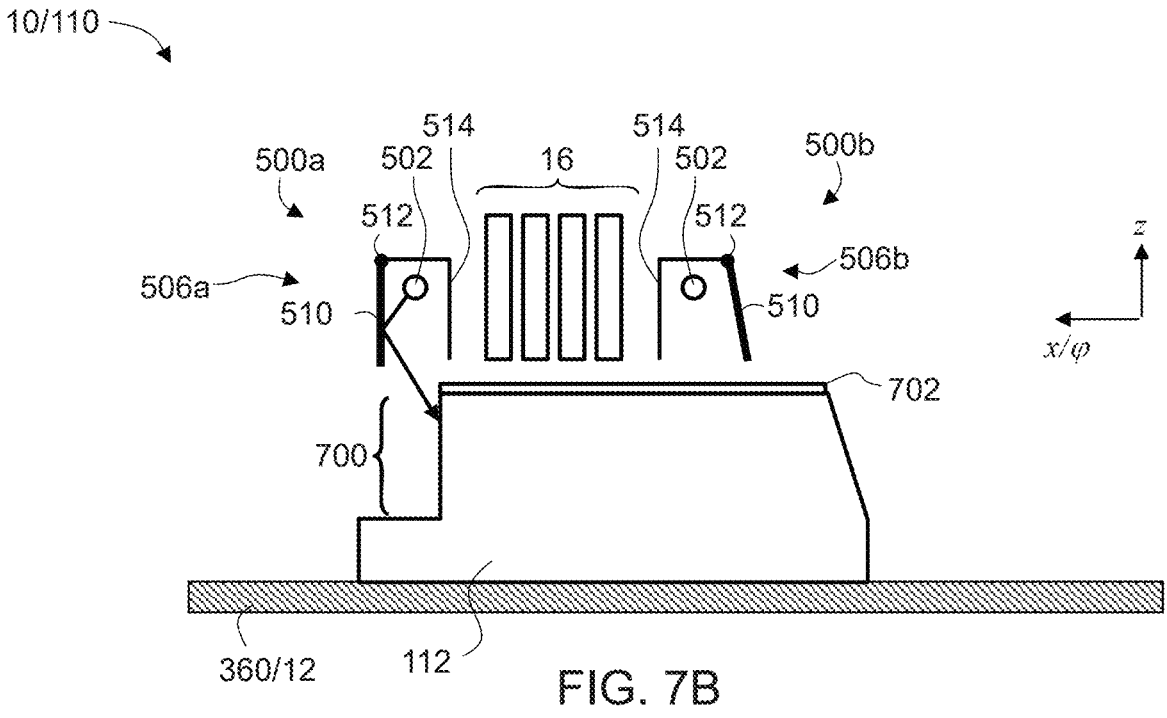
Figure 7C:
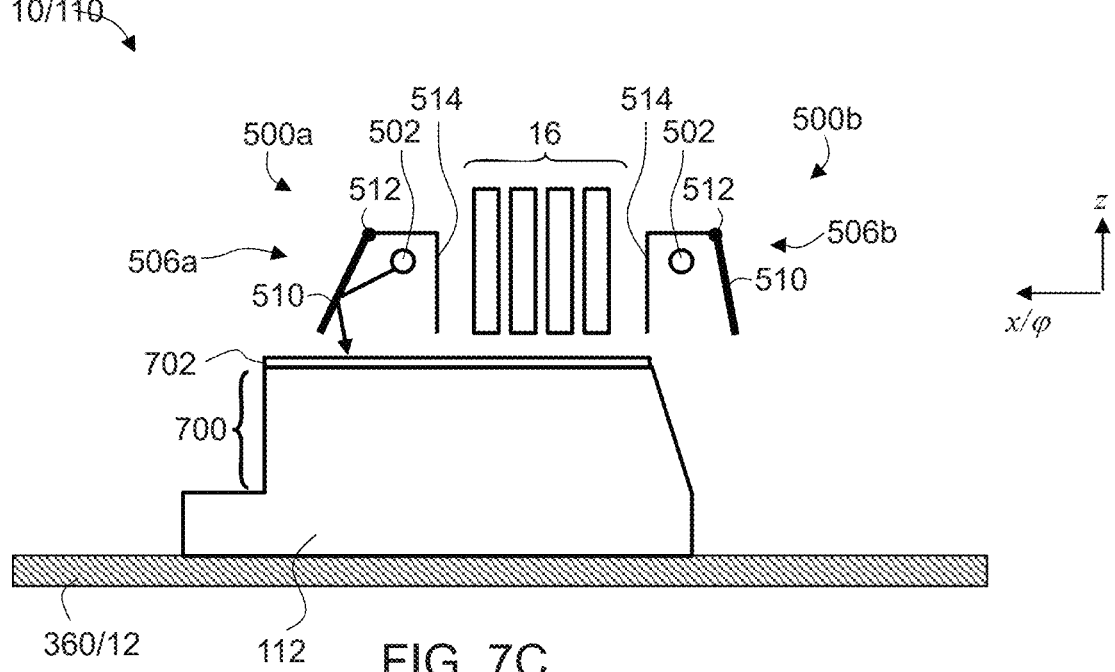

FIGS. 7A-C are schematic illustrations describing a preferred operation principle of three-dimensional printing system 10/110, while fabricating a three-dimensional object. The description is for the case in which only one of the curing systems (500a, in this example) is operative, but the skilled person, provided with this description would know how to operate system 10/110 also when both curing systems are operative. FIG. 7A illustrates a fabrication stage at which the stack 700 of layers that is immediately below the layer 702 being fabricated is generally flat. In this case, wall 510a assumes a generally vertical orientation, which does not vary during the motion of the head 16, providing an angular width which is relatively narrow.

FIGS. 7B and 7C illustrate another fabrication stage. At this stage the stack 700 of layers that is immediately below the layer 702 being fabricated has a vertical wall. In this case, when system 500a is above the vertical wall (FIG. 7B), the rotatable reflective wall 510 of system 500a assumes a non-vertical orientation, providing an angular width which is relatively wide, and when system 500a is above a flat region of stack 700 (FIG. 7C), reflective wall 510 assumes a generally vertical orientation, providing an angular width which is relatively narrow.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following example.

EXAMPLE

Reference is now made to the following example, which together with the above descriptions illustrate some embodiments of the invention in a non limiting fashion.

Figure 8:
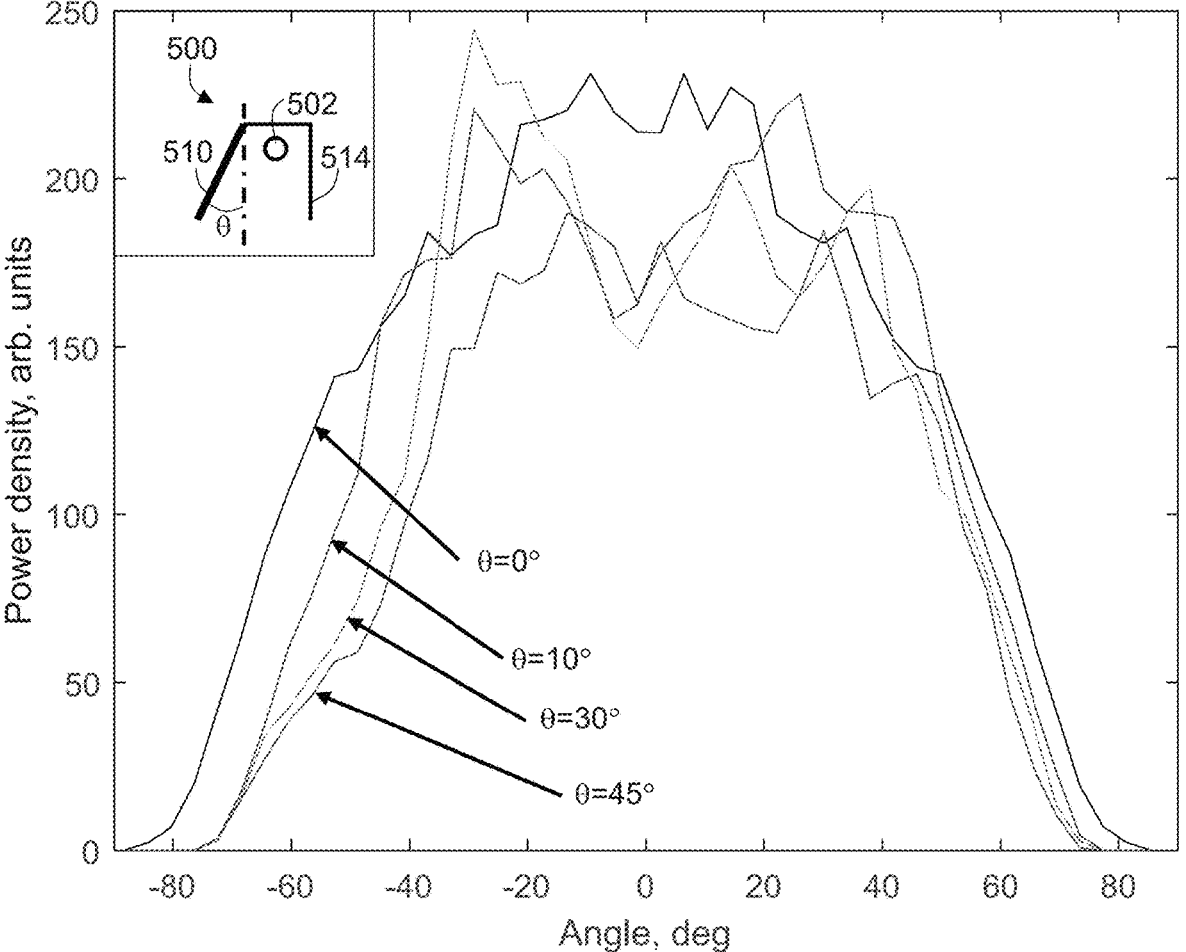
FIG. 8 is a graph of a beam power density as a function of an angle, as obtained by computer simulations performed according to some embodiments of the present invention.

FIG. 8 is a graph showing the beam's power density, in arbitrary units, as a function of the beam's angle relative to the vertical direction, in degrees, for various orientations θ, in degrees, of the rotatable wall 510 of system 500 (see inset). The graph is a result of a ray tracing computer simulations for UV radiation generated by an array of LEDs providing a Lambertian radiation pattern. The space between individual LEDs in the array was simulated to be about 3 mm. The total length of the array, along the indexing direction was simulated to be about 60 mm. The width of system 500 along the x direction (see, e.g., FIG. 5D) was simulated to be about 10 mm, the length of the rotatable 510 and static 514 walls of the beam manipulator along the z direction (see, e.g., FIG. 5D) was simulated to be about 25 mm.

As shown in FIG. 8, for larger values of θ, the beam width becomes narrower, with an angular width at 50% power density of about 110° for θ=0°, about 100° for θ=10°, about 90° for θ=30°, and about 85° for θ=45°.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for additive manufacturing of a three-dimensional object, the system comprising:
    an array of nozzles for dispensing a building material on a receiving surface;
    a curing system having an irradiation source emitting a beam of curing radiation, and a beam manipulator for manipulating an angular width of said beam on said building material; and
    a computerized controller configured to control said array of nozzles to dispense said building material formulation to form a layer in a configured pattern corresponding to a slice of the object, and to control said beam manipulator to select an angular width of said beam based on a three-dimensional shape of a stack of previously formed layers;
    wherein said beam manipulator comprises at least one reflective wall rotatable about an axis parallel to said receiving surface.

2. The system according to claim 1, wherein for at least one layer, said controller is configured to select different angular widths of said beam at different regions of said layer.

3. The system according to claim 1, wherein for at least two layers, said controller is configured to select different angular widths of said beam for different layers, but to maintain constant angular width for at least one of said at least two layers.

4. The system according to claim 2, comprising a user interface having a beam manipulation mode selector, wherein said controller is configured to receive from said beam manipulation mode selector input pertaining to a selection of a beam manipulation mode and to control said beam manipulator based on said input.

5. The system according to claim 1, wherein said controller is configured to increase said angular width when said curing system is above a vertical wall of said stack.

6. The system according to claim 1, wherein said controller is configured to select said angular width based on a type of said building material forming said stack.

7. The system according to claim 1, wherein there is a plurality of arrays of nozzles, each configured to dispense a different building material, and wherein said controller is configured to select said angular width based on a combination of building materials forming said stack.

8. The system according to claim 1, wherein said beam manipulator comprises at least two reflective walls, independently rotatable about said axis.

9. The system according to claim 1, wherein said beam manipulator comprises at least two reflective walls, independently rotatable about different axes.

10. The system according to claim 1, wherein said beam manipulator comprises a static reflective wall generally perpendicular to said receiving surface, and wherein said irradiation source is between said walls.

11. The system according to claim 1, wherein said beam manipulator comprises a linear actuator configured to rotate said at least one rotatable reflective wall.

12. The system according to claim 1, wherein said beam manipulator comprises a rotating actuator configured to rotate said at least one rotatable reflective wall.

13. The system according to claim 1, wherein there are two curing systems, mounted at opposite sides of said array of nozzles, and wherein an orientation of a beam manipulator of one of said curing systems is a reflection of an orientation of another one of said curing systems.

14. A method of additive manufacturing of a three-dimensional object, the method comprising:

dispensing a building material on a receiving surface to form a layer in a configured pattern corresponding to a slice of the object;

emitting a beam of curing radiation onto on said layer; and manipulating an angular width of said beam on said building material based on a three-dimensional shape of a stack of previously formed layers;

wherein said manipulating is by a beam manipulator comprising at least one reflective wall rotatable about an axis parallel to said receiving surface.

15. The method according to claim 14, wherein said manipulating comprises, for at least one layer, selecting different angular widths of said beam at different regions of said layer.

16. The method according to claim 14, wherein said manipulating comprises, for at least two layers, selecting different angular widths of said beam for different layers, but maintaining a constant angular width for at least one of said at least two layers.

17. The method according to claim 14, wherein said manipulating comprises increasing said angular width when a curing system emitting said radiation is above a vertical wall of said stack.

18. The method according to claim 14, wherein said manipulating comprises selecting said angular width based on a type of said building material forming said stack.

19. The method according to claim 14, comprising dispensing a plurality of different building materials, wherein said manipulating comprises selecting said angular width based on a combination of building materials forming said stack.

20. The method according to claim 14, wherein said dispensing is by an array of nozzles and said emitting is by two curing systems mounted at opposite sides of said array of nozzles.

* * * * *